US006820784B2

(12) United States Patent
Gao et al.

(10) Patent No.: US 6,820,784 B2
(45) Date of Patent: Nov. 23, 2004

(54) METHOD OF CUTTING A LAMINATED WEB AND REDUCING DELAMINATION

(75) Inventors: Zhanjun Gao, Rochester, NY (US); Yeh-hung Lai, Webster, NY (US); Mridula Nair, Penfield, NY (US); Aparna Vasant Bhave, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 8 days.

(21) Appl. No.: 10/027,296

(22) Filed: Dec. 21, 2001

(65) Prior Publication Data

US 2003/0116597 A1 Jun. 26, 2003

(51) Int. Cl.[7] .......................... B26F 3/00; B23D 19/04

(52) U.S. Cl. .............................. 225/2; 83/500; 83/675; 225/94

(58) Field of Search .......................... 83/675, 500, 940, 83/51, 496; 30/357; 225/103–105, 2, 94, 96, 93; 430/22, 496, 536, 538

(56) References Cited

U.S. PATENT DOCUMENTS

| | | | | | |
|---|---|---|---|---|---|
| 2,510,383 | A | * | 6/1950 | Dalgleish | 156/251 |
| 2,523,861 | A | * | 9/1950 | Buttress | 156/45 |
| 2,712,169 | A | * | 7/1955 | Buttress | 156/347 |
| 3,147,134 | A | * | 9/1964 | Clark | 430/644 |
| 3,375,112 | A | * | 3/1968 | Theodorou | 430/536 |
| 3,582,339 | A | * | 6/1971 | Martens et al. | 430/505 |
| 3,595,111 | A | * | 7/1971 | Hershberger | 83/19 |
| 3,746,564 | A | * | 7/1973 | Parsons | 430/231 |
| 4,092,173 | A | * | 5/1978 | Novak et al. | 430/531 |
| 4,196,001 | A | * | 4/1980 | Joseph et al. | 430/502 |
| 4,729,274 | A | * | 3/1988 | Marbach | 83/684 |
| 4,793,393 | A | * | 12/1988 | Pelz | 144/350 |
| 5,013,392 | A | * | 5/1991 | Virgadamo | 156/584 |
| 5,084,344 | A | * | 1/1992 | Harada et al. | 428/334 |
| 5,274,319 | A | | 12/1993 | Keener et al. | |
| 5,423,239 | A | | 6/1995 | Sakai et al. | |
| 5,423,240 | A | | 6/1995 | Detorre | |
| 5,794,500 | A | | 8/1998 | Long et al. | |
| 5,806,388 | A | * | 9/1998 | Imataki | 83/13 |
| 5,866,282 | A | | 2/1999 | Bourdelais et al. | |
| 5,974,922 | A | | 11/1999 | Camp et al. | |
| 6,043,009 | A | | 3/2000 | Bourdelais | |
| 6,401,510 | B1 | * | 6/2002 | Morse et al. | 72/327 |

OTHER PUBLICATIONS

"Fracture Mechanics, Fundamentals and Applications", T.L. Anderson, 1991, pp 56–60.

"Friction, Wear, Lubrication, A Text Book in Tribology", K.C. Ludema, CRC Press, Inc., 1996.

* cited by examiner

*Primary Examiner*—Kenneth E. Peterson
*Assistant Examiner*—Isaac Hamilton
(74) *Attorney, Agent, or Firm*—Mark G. Bocchetti; Paul A. Leipold

(57) ABSTRACT

A method for cutting a laminated web including the steps of engaging a first side of the laminated web with a crack initiator having a high rake angle, the crack initiator extending from a first cutter base having a low rake angle, the laminated web including at least a support web, and an upper layer that may, at least for imaging elements, be considered a protective layer, the upper layer being thinner than the support web, the upper layer being located at the first side of the laminated web structure; simultaneously engaging a second side of the laminated web with a second cutter, the second cutter being offset from the first cutter; generating a first crack in the first side of the laminated web with the crack initiator completely through the upper layer; engaging the web with the cutter base of the first cutter; and further propagating the first crack beyond the tip of the first crack initiator using the cutter base, whereby the tip of the first crack initiator is disengaged from the laminated web.

17 Claims, 5 Drawing Sheets

METHOD OF CUTTING A LAMINATED WEB AND REDUCING DELAMINATION

CROSS-REFERENCE TO RELATED APPLICATIONS

The present application is related to U.S. application Ser. No. 10/037,017 filed same day herewith by Yeh-hung Lai, et al and entitled, "APPARATUS AND METHOD FOR CUTTING SHEET MATERIALS".

FIELD OF THE INVENTION

This present invention relates generally to apparatus and methods for cutting webs, and, more particularly, to methods for cutting a laminated web structure and, most particularly, laminated or multilayered imaging elements that include at least one upper or protective layer, an image-forming layer, and an imaging support.

BACKGROUND OF THE INVENTION

Laminated webs are utilized widely for various applications. In imaging applications, for example, a protective layer is often used over the image-forming layer to protect it from being harmed by contact friction with apparatus parts and between the front and back surfaces of the element. It may also be used to control moisture, curl, stiffness, and other physical properties.

The laminated web and laminated imaging element are typically formed in long, wide sheets and then spooled into large rolls. These large wide rolls must then be converted into predetermined smaller sizes by slitting, chopping, and/or perforating the large wide rolls. It is important that the various conversion operations, also referred to as cutting processes, be performed without damaging the web. It is also important that the conversion be performed without creating substantial amounts of dust or hair-like debris that might lead to undesirable contamination of imaging surfaces for imaging applications.

The generation of this hair-like debris is generally attributed to an adverse combination of stiffness and toughness of the various layers of the laminated web. A poor combination of stiffness and toughness properties of various layers results in uncontrolled crack propagation during cutting and the subsequent formation of hair-like debris. For example, there is a problem with the element described in U.S. Pat. No. 5,866,282 in that the cutting of this imaging element results in the creation of substantial amounts of hair-like debris which are highly undesirable. The poor cutting performance may be traced at least in part to the material selection and ordering in the laminate, resulting in an adverse combination of stiffness and toughness of the various layers of the imaging element and uncontrolled crack propagation during cutting.

The process of cutting sheet materials is similar to driving a crack through a material using a wedge. Accordingly, fracture mechanics theory ("*Fracture Mechanics, Fundamentals and Applications*", T. L. Anderson, 1991) may be used to guide the selection of layer materials that produce the desired cutting performance. Fundamentally, cutting processes are fracture processes. One needs to initiate and propagate a crack through the thickness of the substrate. A clean cut usually requires good control over crack initiation and propagation throughout the cutting process.

Many methods and apparatus for cutting laminated imaging elements are known in the art. These prior art cutting methods and apparatus include cutting wheels, ultrasonic cutters, scissor type cutters and guillotine knives. FIG. 1 is a partial sectional view illustrating the cutting edge portions of typical, opposing prior art cutters including an upper knife 10 and a lower knife 12 for cutting and slitting an imaging element 14. The first and second cutters are separated by a clearance 15. Imaging element 14 typically includes a support web 16 with an imaging layer or multilayer composite layer 26 coated thereon. It is common for the lower knife 12 to have a square edge or low rake angle 22 and low relief angle 20, and the upper knife 10 to be ground at some rake angle 18. The upper knife 10 may also have a low relief angle 24. The upper knife 10 generally has been applied to the upper or photosensitive side of the imaging element 14 during slitting with the lower knife 12 in contact with the opposite side thereof. However, in some instances, the reverse has been practiced. Typically, the upper knife blade previously used has had a low rake angle, 10–15 degrees, ground on the edge. The low rake angle was used because it was an improvement over a square edge with no rake, and a mid range angle, such as 30 to 45 degrees. More recently, U.S. Pat. No. 5,974,922—Camp, et al. discloses a high rake knife for slitting photographic papers.

A significant disadvantage in these prior art methods was the inability to cut the web without cutting or damaging one or more of the weaker layers and interfaces. Another major disadvantage was the inherent difficulty experienced when trying to control the material fall-off, which produces dust from the cut process. Therefore, there is a continuing problem with dirt and debris generated during cutting that will contaminate images during development. This is especially true for laminated imaging elements that have thick, tough polymer protective layers, and the image-forming layer is very stress sensitive.

It has been a technical challenge to cut laminated imaging elements without damaging the finished edges and generating debris. This problem is more significant nowadays since tough polymer layers are often used as protective layers for a laminated imaging element. The addition of this tough layer may change the cutting characteristics of the imaging element. Therefore, when using the existing method and tool in the art, the cutting operation causes significant defect and debris that is not acceptable.

SUMMARY OF THE INVENTION

It is therefore an object of the present invention to provide an improved method for cutting laminated webs such as imaging/photographic elements.

It is a further object of the present invention to provide a method for cutting laminated webs, especially laminated imaging elements, that generates less cutting defects during the cutting process.

A further object of the present invention is to provide a method for cutting laminated webs, such as imaging/photographic elements, which reduces damage to the interface between layers or laminates.

Yet another object of the present invention is to provide a method for cutting laminated webs, such as imaging/photographic elements, that reduces the amount of dust and debris produced by the cutting operation.

Briefly stated, the foregoing and numerous other features, objects and advantages of the present invention will become readily apparent upon a reading of the detailed description, claims and drawings set forth herein. These features, objects and advantages are accomplished by providing a method for cutting a laminated web, comprising the steps of engaging a first side of the laminated web with a crack initiator having a high rake angle, the crack initiator extending from a first cutter base having a low rake angle, the laminated web including at least a support web and an upper layer that may, at least for imaging elements, be considered a protective layer, the upper layer being thinner than the support web, the upper layer being located at the first side of the laminated web structure; simultaneously engaging a second side of the laminated web with a second cutter; generating a first crack in the first side of the laminated web with the crack initiator completely through the upper layer; engaging the web with the cutter base of the first cutter and further propagating the first crack using the cutter base while disengaging the crack initiator of the first cutter. With the crack initiator disengaged, the method may include the step of propagating the crack through to the second side of the laminated web. Alternatively, the method may include the step of generating a second crack in the second side of the web with the second cutter and propagating the first cut to intersect with the second crack.

The laminated web may further include one or more intermediate layers. When the laminated web is an imaging element, the intermediate layer would be an imaging/photographic layer or composite layer such as, for example, a silver halide layer.

As described above, the first or upper side of the laminated web is the side with the protective layer. The protective layer is thinner than the support web. In the case of the laminated imaging/photographic element, the protective layer is located over the intermediate layer, which is the image-forming layer or composite.

To prevent delamination at the interface of the laminate, it is desirable to reduce the stress at this interface. Therefore, by letting the thinner protective layer face the crack initiator, the crack initiator drives the crack past this interfacial region much faster than prior art cutting methods. The crack initiator confines the high stress concentration near the tip of the crack initiator without spreading the stress over to this stress-sensitive region, particularly the interface between layers. Furthermore, the crack passes through the interface at a much lower level of knife force since the knife force increases monotonically during cutting until the last stage of the cutting process. Once the crack has passed this stress-sensitive region, the low rake cutter base can come into more intimate contact with the laminated web being cut to take over the load previously carried by the crack initiator. From this point on, the crack propagation would be driven by the low rake cutter base and the crack initiator tip would gradually disengage from the laminated web. Since the crack initiator has minimal contact with the laminated web, the wear rate at the tip of the cutter is reduced, resulting in a longer tool life. Thus, with the combination of the high rake cutter tip and low rake cutter base, long tool life and high cut quality are achieved.

The term “laminated web” as used herein is intended to refer to and include webs that contain more than one layer of materials bonded together through chemical, thermal, mechanical, or other method. Specifically, a “laminated web” includes laminates that are obtained by running two or more individual layers of materials through a laminator that applies heat and pressure to bond the layers into one sheet material. To obtain good adhesion between the layers, adhesive materials are often applied between them. A laminated imaging element is a laminated web that contains at least one imaging-forming layer. “Laminated webs” also include support webs having other layers coated and/or laminated thereon. In other words, a laminated imaging/photographic element would include a support web, with imaging/photographic layer(s) coated thereon, and a protective layer either coated or laminated over the imaging/photographic layer(s).

The upper or protective layer of an imaging element may comprise one or more thin sheets of high modulus polymers such as high density polyethylene, polypropylene, or polystyrene; their blends or their copolymers. The upper or protective layer may have a thickness in the range of from about 10 to about 300 $\mu$m. The protective layer of the laminated imaging element may also comprise polymeric materials that have been obtained from coating. For example, methods for improving the scratch resistance include adding a certain class of hardener to gelatin; using colloidal silica in the overcoat layer either alone or in combination with a water soluble polymer having a carboxylic acid group; using two overcoat layers, the upper layer containing a colloidal silica and the lower layer containing a polymer latex; and using a composite latex comprising a polymeric acrylic acid ester and/or a polymeric methacrylate acid ester and colloidal silica.

An example of laminated imaging element is disclosed in U.S. Pat. No. 6,043,009 to Bourdelais et al., which discloses a photographic element comprising a paper base, at least one photosensitive silver halide layer, and a layer of microvoided, biaxially oriented polyolefin sheet between the paper base and the silver halide layer. The photographic element in U.S. Pat. No. 6,043,009 has much less tendency to curl when exposed to extremes of humidity. Further, it provides a photographic paper that is much lower in cost as the criticalities of the formation of the polyethylene are removed. There is no need for the difficult and expensive casting and cooling in forming a surface on the polyethylene layer as the biaxially oriented polymer sheet of the invention provides a high quality surface for casting of photosensitive layers. The optical properties of the photographic elements are improved, as the color materials may be concentrated at the surface of the biaxially oriented sheet for most effective use with little waste of the colorant materials. Photographic materials utilizing microvoided sheets have improved resistance to tearing.

The addition of a protective layer made of a tough plastic (such as polyester) places a relatively soft and brittle image-forming layer in between two or more tough layer, causing potential cutting problems. A significant disadvantage in the prior art methods was the inability to cut the web without cutting or damaging one or more of the weaker layers and interfaces therebetween. Another major disadvantage was the inherent difficulty experienced when trying to control the material fall-off, which produces dust from the cut process. Therefore, there is a continuing problem with dirt and debris generated during cutting that will contaminate images during development. This would be especially true for imaging elements that have thick, tough polymer protective layers.

DETAILED DESCRIPTION OF THE INVENTION

Figure 2:
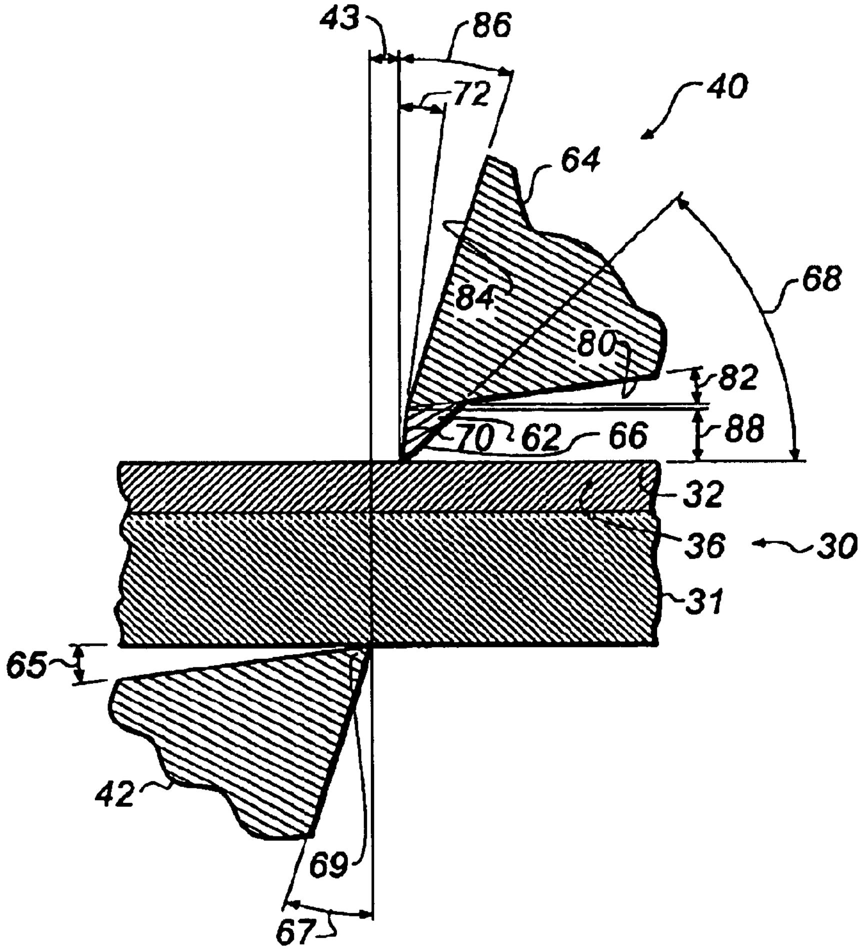
FIG. 2 is a partial sectional view illustrating the cutting edge portions of the opposing cutters used in the practice of the method of the present invention with a laminated sheet material residing therebetween.

Referring to FIG. 2 there is illustrated a laminated web 30 including at least one upper layer 32, in addition to a support web 31. The laminated web 30 is depicted residing between the cut edge portion of first and second opposing cutters 40, 42 (shown in partial cross-section). The first and second cutters are separated by a clearance 43. The first and second opposing cutters 40, 42 can be circular slitter knife blades, curve slitter knife blades, straight slitter knife blades, curve chopping knife blades, straight chopping knife blades, and scissors. The first cutter 40 includes a crack initiator 62 and a low rake cutter base 64. The crack initiator 62 further includes a rake edge 66 with a rake angle 68; and a relief edge 70 with a relief angle 72. The low rake cutter base 64 includes a rake edge 80 with a rake angle 82; and a relief edge 84 with a relief angle 86. The crack initiator 62 and low rake cutter base 64 can be made by a variety of methods including, for example, electric discharge machining, chemical etch, grinding, milling, molding, lapping, assembling two separate pieces of material, honing or burnishing. The main functions of the crack initiator 62 are to initiate and propagate a crack until the base rake edge 80 contacts the upper layer 32 of the laminated web 30 and begins to drive the cutting process. Specifically, the crack initiator 62 is used to penetrate through the upper coating or laminate 32 and into the base web 31 while keeping the stress in the laminated web 30 concentrated around the crack initiator 62 rather than spreading the high stress outside this confined zone and into a larger area. With this highly concentrated stress zone, the stress seen by the material or regions sensitive to stress, specifically the planar interface 36, is reduced. Reducing the stress at the planar interface 36 reduces the damage thereto resulting in reduced cutting defects. The function of the cutter base 64 is to continue the cutting process after the rake edge 80 of the cutter base 64 comes into contact with the laminated web 30 by taking over the cutting force from the crack initiator 62. As the cutter base 64 takes over the cutting force, it can protect the crack initiator 62 from further high stress contact of the laminated web 30 thereby resulting in a longer life of the crack initiator 62 and a longer tool life of the first cutter 40.

Figure 1:
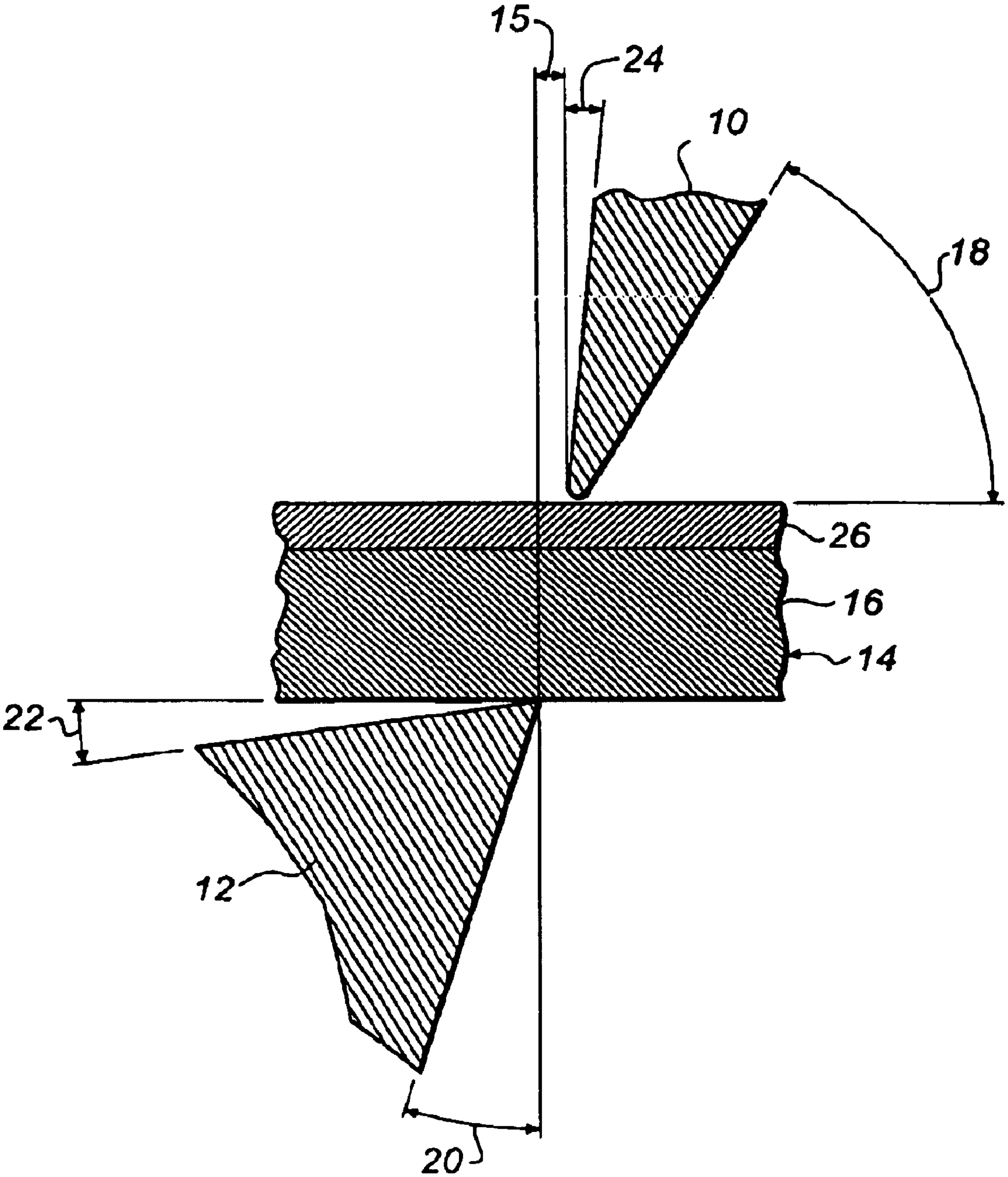
FIG. 1 (PRIOR ART)
FIG. 1 is a partial sectional view illustrating the cutting edge portions of opposing prior art cutters with a laminated sheet material residing therebetween.

Second opposing cutter 42 is substantially identical to the prior art cutter 12 depicted in FIG. 1. Therefore, rake angle 65, relief angle 67 and the sharpness of edge 69 are substantially identical to rake angle 22, relief angle 20 and the sharpness of edge of the lower knife 12. The first and second cutters are separated by a clearance 43.

Figure 2A:
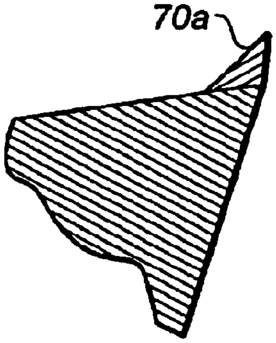
FIG. 2*a* is a partial sectional view illustrating an alternative embodiment of a second cutter having a crack initiator.

Alternatively, as shown in FIG. 2*a*, the second cutter 42 may be provided with a crack initiator 70*a*.

To achieve the functions described above, the crack initiator 62 should have a rake angle 68 in the range between 30° and 70°, preferably between about 40° and 70°, and most preferably between about 45° and 70°, and a relief angle 72 larger than 0° and smaller than about 30°. Although shown in FIG. 2 as straight, the rake edge 66 and relief edge 70 of the crack initiator can be slightly curved. The initiator height 88 of the crack initiator 62 depends on the depth of where the stress sensitive region in the cut material is located. The range of the initiator height 88 may be from 5 microns to the thickness of the laminated web. Preferably, the initiator height is at least 15 μm and, most preferably, the initiator height is at least 20 μm. More preferably, the initiator height is at least equal to the thickness of the protective layer 32. The relief angle 86 of the cutter base 64 is in the range from 0° to 30° from vertical with respect to the plane of the web. The rake angle 82 of the cutter base 64 should be at least about 15° less than the angle 68 and is preferably at least about 20° less than angle 68. The rake edge 80 of the cutter base 64 can be slightly curved. The intersection between the base rake edge 80 and initiator rake edge 66 can have a distinct angle or simply a smooth curved transition.

The method for cutting a laminated web 30 comprises the steps of engaging a first side of the laminated web 30 with a crack initiator 62 having a high rake angle 68, the crack initiator 62 extending from a first cutter base 40 having a low rake angle 82; simultaneously engaging a second side of the laminated web 30 with a second cutter 42; generating a first crack in the first side of the laminated web 30 with the crack initiator 62; engaging the web 30 with the cutter base 64 of the first cutter 40; further propagating the first crack using the cutter base 64; and disengaging the crack initiator 62 of the first cutter 40. With the crack initiator 62 thereby disengaged the crack may be completed by propagating the crack through to the second side of the laminated web 30, or generating a second crack in the second side of the web 30 with the second cutter 42 and propagating the first cut to intersect with the second crack propagating from the second cutter. The first side of the laminated web (engaged by the crack initiator 62) is the side with thinner layer. In other words, upper layer 32 is thinner than the support web 30.

Figure 3:
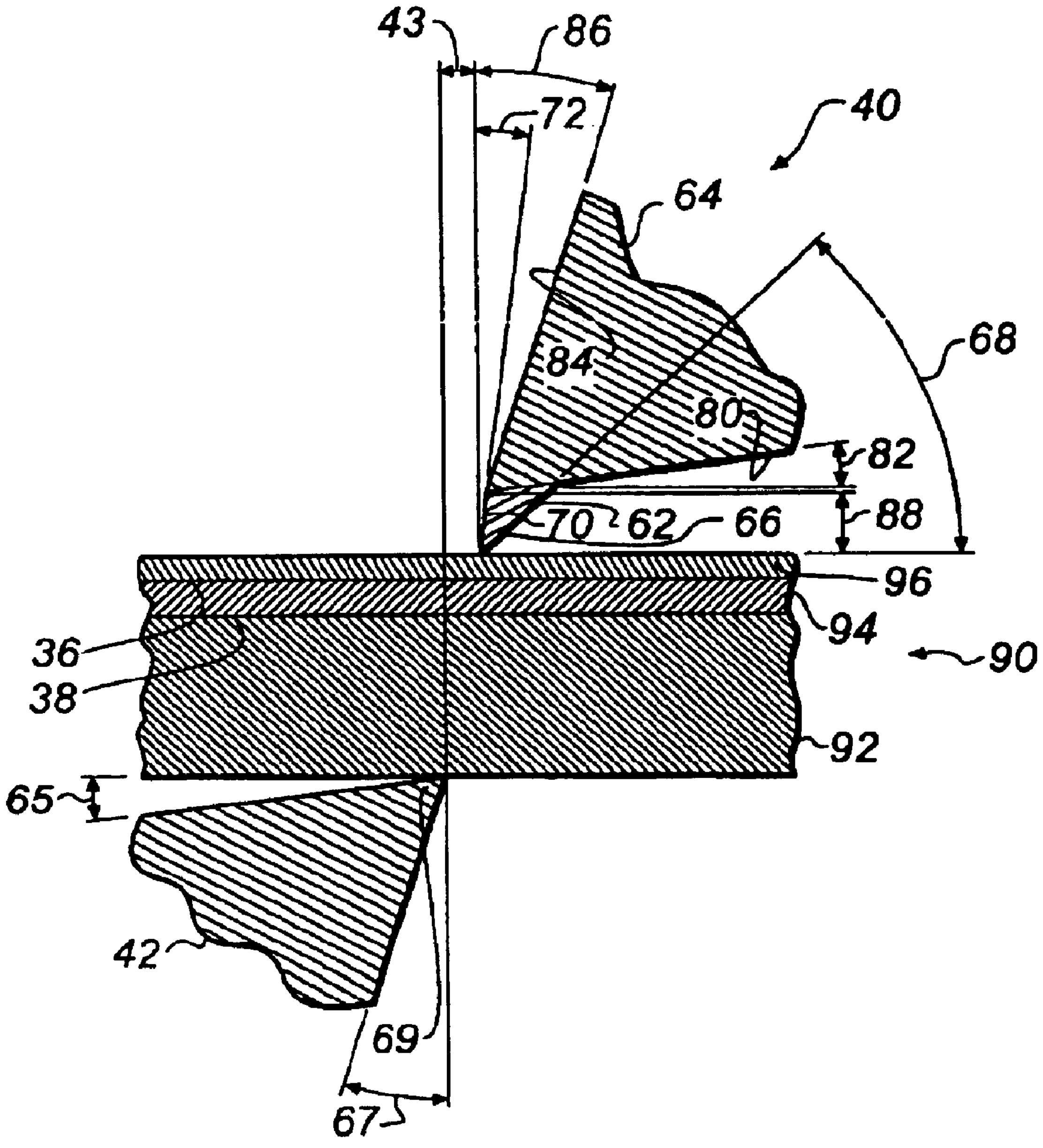
FIG. 3 is a partial sectional view illustrating the cutting edge portions of the same opposing cutters depicted in FIG. 2 with a three layer laminated web residing therebetween.

Looking next at FIG. 3, there is presented a partial sectional view illustrating the cutting edge portions of the same opposing cutters 40, 42 depicted in FIG. 2 with a laminated web 90 residing therebetween. Laminated web 90 includes a support web 92, an intermediate layer 94 and an upper layer 96. As shown, laminated web 90 is an adequate representation of a laminated imaging element wherein the intermediate layer 94 comprises an imaging forming layer or an imaging forming composite of layers, and upper layer 96 comprises a protective coating or laminate over the imaging forming layer. The support web 92 and upper layer 96 may themselves be a laminated material as well.

EXAMPLES

Figure 5A:
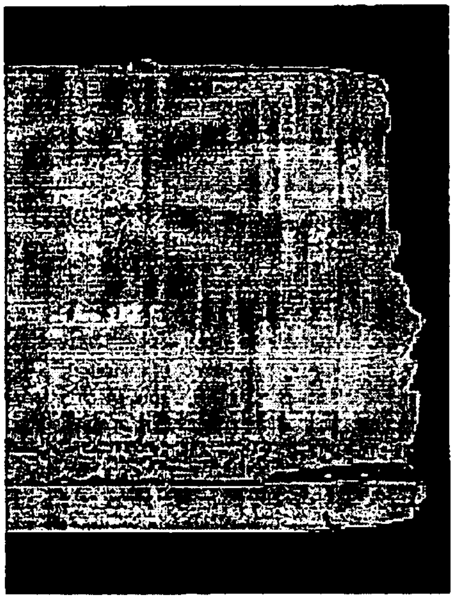
FIG. 5(a) (PRIOR ART)
FIGS. 5(*a*) and (*b*) are photomicrographs showing the fracture morphologies of a laminated imaging element using the prior art knife depicted in FIG. 1.
Figure 5B:
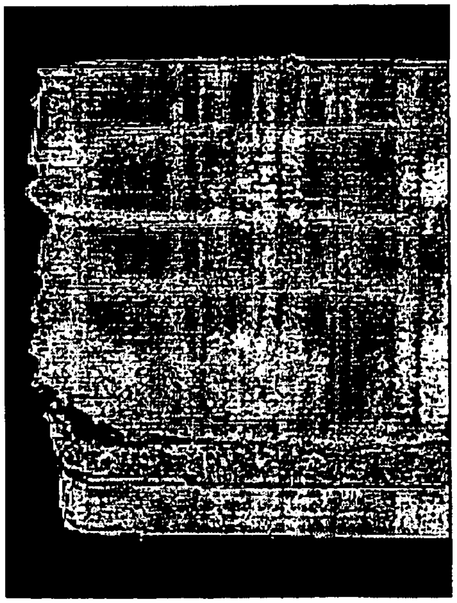
FIG. 5(b) (PRIOR ART)
Figure 6B:
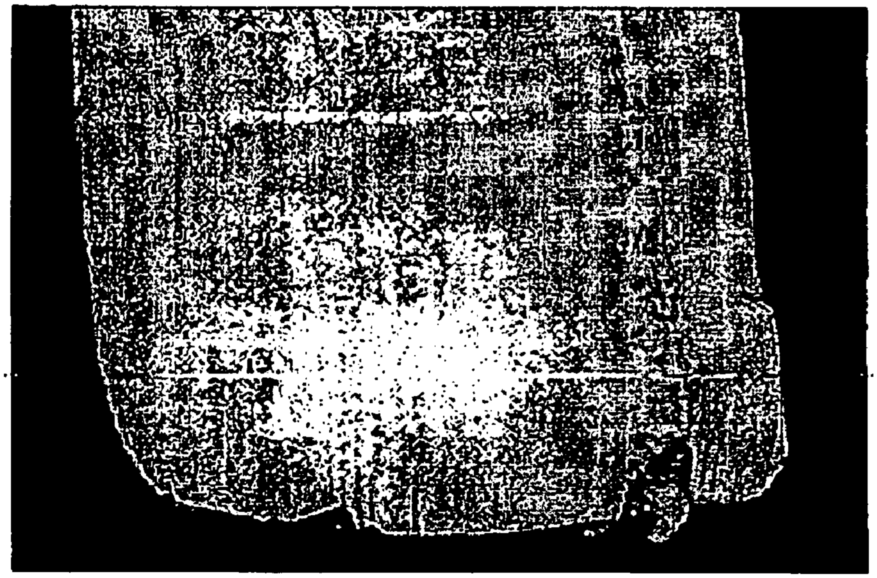
FIGS. 6(*a*) and (*b*) are photomicrographs showing the fracture morphologies of a laminated imaging element using the cutters and method of the present invention as exemplified in FIGS. 2 and 3.
Figure 6A:
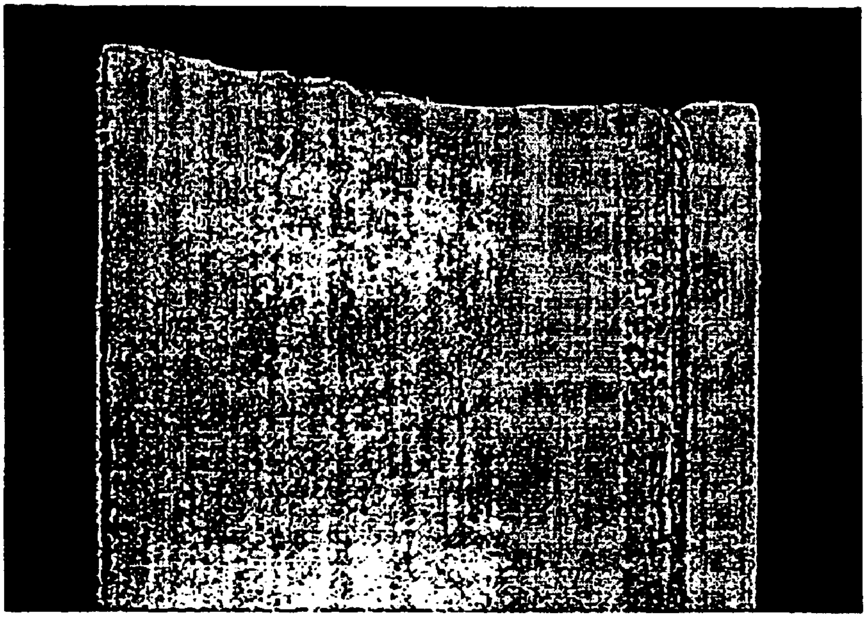

The advantages of the present invention can be illustrated experimentally by comparing the cut edges of a laminated web from the prior art method to the current invention method. FIGS. 5(*a*) and (*b*) are photomicrographs showing the fracture morphologies of a laminated imaging element using the prior art knife depicted in FIG. 1. FIGS. 5(*a*) and (*b*) are the left and right edges, respectively, after the web is cut into two pieces. FIGS. 6 (*a*) and (*b*) are photomicrographs showing the fracture morphologies of a laminated imaging element using the cutters and method of the present invention as exemplified in FIG. 3. Comparing the damage near the interfaces of the image-forming layer, it is apparent that significantly less interface damage is generated with the method of the present invention.

The cutting process of a laminated image element is simulated by the finite element technique in the following examples. In accordance with conventional finite element analysis techniques, the first step is to generate a geometric representation of the entire imaging element including all layers and cutting knives. A geometric model of the imaging element is created by dividing all imaging element components into discrete elements (also called mesh). The cutting knives are modeled as rigid surfaces since typical knives are made of material much stiffer than materials for the imaging element. A pair of typical knives is modeled. Each layer of the imaging element is modeled as an elastic/plastic material with work hardening and a break of elongation value. The finite element results have been validated experimentally by comparing the deformation and damage during and after cutting.

The table below tabulates the results of cutting from this invention and from control sample. The thickness of the protective layer, image-forming layer and support are 2 mil, 1 mil and 7 mils, respectively.

Figure 4:
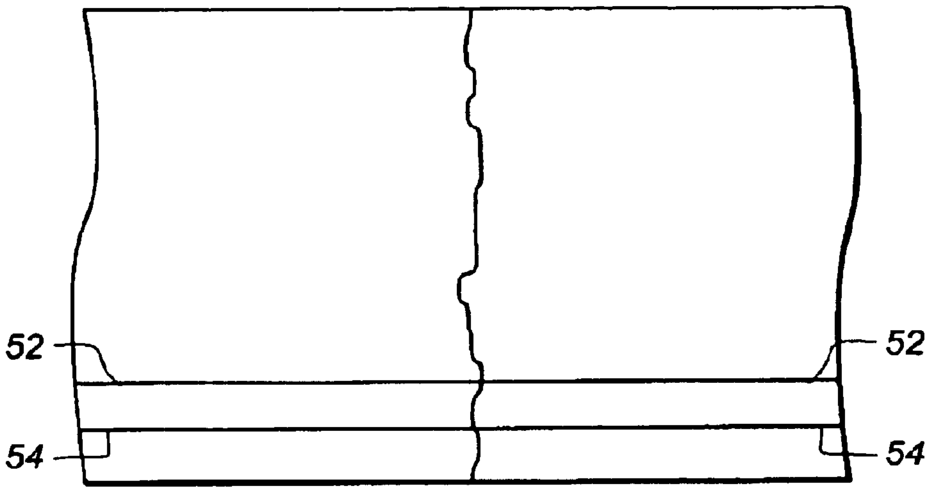
FIG. 4 (PRIOR ART)
FIG. 4 is a schematic edge view illustration showing the fracture morphology of a laminated imaging element using the prior art knife depicted in FIG. 1.

Example 1 (Control) is the cutting result using the method in the prior art. Damages caused by cutting the laminated imaging element used in the examples are in the form of planar cracks along the interfaces 52 and 54, shown in FIG. 4, near the cut. The angles of the prior art knives 12, 10 shown in FIG. 1 are: angle 20=10°, angle 22=0°, angle 18=26°, and angle 24=0°. The total length of these interfacial cracks is shown in the table as the crack length, which is used as a main indicator of the quality of the cutting edges. The smaller the crack length, the higher the cut quality.

Example 2 is the cutting result using the method of this invention. The first cutter 40 (upper cutter), of FIG. 3 had a crack initiator 62 with a 30-degree rake angle 68. Angels 82 and 72, and 86 are zero. The height 88 of the crack initiator is 3 mils. The second cutter 42 (lower cutter) is the same as the Example 1. The total crack length in this case is 0.8 mils. The improvement factor, η, in the table is defined as the decrease of the crack length normalized by the crack length of the control sample, i.e., $$\eta = \frac{\text{Crack Length of the Control Sample} - \text{Crack Length of the Curent Sample}}{\text{Crack Length of the Control Sample}} \times 100\% \quad (1)$$

For example, in Example 2, we have $$\eta = \frac{1.8 - 0.8}{1.8} \times 100\% = 55\%$$

Example 3 is the cutting result using the method of this invention. The rake angle 68 of the crack initiator 62 of the first cutter 40 is 45-degree. The height of the crack initiator 88 is 3 mils. All other cutter dimensions are the same as Example 2. The total crack length in this case is 0.82 mils.

Example 4 is the cutting result using the method of this invention. The rake angle 68 of the crack initiator 62 of the first cuter 40 is 60-degree. The height of the crack initiator is 3 mils. All other cutter dimensions are the same as Example 2. The total crack length in this case is 0.85 mils.

Example 5 is the cutting result using the method of this invention. The rake angle 68 of the crack initiator 62 of the first cuter 40 is 45-degree. The height of the crack initiator is 2 mils. All other cutter dimensions are the same as Example 2. The total crack length in this case is 1 mil.

Example 6 is the cutting result using the method of this invention. The rake angle 68 of the crack initiator 62 of the first cuter 40 is 45-degree. The height of the crack initiator is 1 mil. All other cutter dimensions are the same as Example 2. The total crack length in this case is 1 mil.

TABLE

| | Rake Angle* (degree) | Initiator Height* (mil) | Crack Length** (mil) | Improvement Factor, η*** |
|---|---|---|---|---|
| Example 1 (control) | | N/A | 1.8 | 0 |
| Example 2 | 30 | 3 | 0.8 | 55% |
| Example 3 | 45 | 3 | 0.82 | 54% |
| Example 4 | 60 | 3 | 0.85 | 52% |
| Example 5 | 45 | 3 | 1 | 44% |
| Example 6 | 45 | 1 | 1 | 44% |

*Angle 68 and initiator height 88 defined in FIG. 3
**This is the length of the crack along the interface between the upper layer and image-forming layer. The crack is generated during cutting
***The improvement factor, η is in Equation (1)

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List

10 Upper Knife
12 Lower Knife
14 Imaging Element
15 Clearance
16 Support Web
18 Rake Angle
20 Low Relief Angle
22 Low Rake Angle
24 Low Relief Angle
26 Imaging Layer
30 Laminated Web
31 Support Web
32 Upper Layer
36 Planar Interface
38 Planar Interface
40 1st Opposing Cutter
42 2nd Opposing Cutter
43 Clearance
62 Crack Initiator
64 Rake Cutter Base
65 Rake Angle
66 Rake Edge
67 Relief Angle
68 Rake Angle
69 Sharpness of Edge
70 Relief Edge
72 Relief Angle
80 Rake Edge
82 Rake Angle

84 Relief Edge

86 Relief Angle

88 Initiator Height

90 Laminated Web

92 Support Web

94 Intermediate Layer

96 Upper Layer

What is claimed is:

1. A method of cutting a laminated web structure comprising the steps of:

(a) engaging a first side of the laminated web with a first crack initiator having a high rake angle, the first crack initiator extending from a first cutter base having a low rake angle, the laminated web including at least a support web, and an upper layer, the upper layer being thinner than the support web, the upper layer being located at the first side of the laminated web structure;

(b) simultaneously engaging a second side of the laminated web with a second cutter, the second cutter being offset from the first cutter such that said first and said second cutter are separated by a clearance;

(c) generating a first crack in the first side of the laminated web with the first crack initiator completely through the upper layer;

(d) engaging the laminated web with the cutter base of the first cutter; and (e) further propagating the first crack beyond the tip of the first crack initiator using the first cutter base wherein:

the high rake angle of the first crack initiator is in the range of from 45° to 70° and wherein:

the low rake angle of the first cutter is at least about 15° less the high rake angle of the first crack initiator and greater than 0°.

2. A method as recited in claim 1 further comprising the step of:

propagating the crack through to the second side of the laminated web.

3. A method as recited in claim 1 further comprising the steps of:

(a) generating a second crack in the second side of the web with the second cutter; and (b) propagating the first crack to intersect with the second crack.

4. A method as recited in claim 1 wherein:

the second cutter includes a second crack initiator.

5. A method as recited in claim 1 wherein:

the first crack initiator has a height that is greater than a thickness of the upper layer on the first side of the laminated web structure and is at least 5 microns.

6. A method as recited in claim 4 wherein:

the second crack initiator has a high rake angle in the range of from 45° to 70°.

7. A method as recited in claim 1 wherein:

the first crack initiator has a relief angle of less than 30°.

8. A method as recited in claim 1 wherein:

the first cutter base has a relief angle of less than 30°.

9. A method as recited in claim 3 wherein:

the first crack initiator includes a relief edge that is either straight or curved.

10. A method as recited in claim 1 wherein:

the first cutter base has a rake edge that is either straight or curved.

11. A method as recited in claim 10 wherein:

the first cutter base has a relief edge that is either straight or curved.

12. A method as recited in claim 1 wherein:

the laminated web structure includes at least one additional layer residing between the support web and the upper layer.

13. A method as recited in claim 1 wherein:

the laminated web structure is an imaging element and the upper layer is a protective layer.

14. A method as recited in claim 1 wherein:

the laminated web structure is an imaging element and the upper layer is a polymeric material.

15. A method as recited in claim 14 wherein:

the polymeric material is coated onto the support web or onto an intermediate layer.

16. A method as recited in claim 14 wherein:

the polymeric material is a separate web laminated onto the support web or onto an intermediate layer.

17. A method as recited in claim 1 wherein:

the upper layer is selected from a group consisting of polyethylene, polypropylene, or polystyrene, a blend thereof, and a copolymer thereof.

* * * * *